United States Patent [19]

Avaneas

[11] Patent Number: 4,841,551
[45] Date of Patent: Jun. 20, 1989

[54] HIGH SPEED DATA-CLOCK SYNCHRONIZATION PROCESSOR

[75] Inventor: Napoleon G. Avaneas, Kings Park, N.Y.

[73] Assignee: Grumman Aerospace Corporation, Bethpage, N.Y.

[21] Appl. No.: 205,582

[22] Filed: Jun. 6, 1988

Related U.S. Application Data

[63] Continuation of Ser. No. 7,504, Jan. 5, 1987, abandoned.

[51] Int. Cl.[4] .......................... H04L 7/00; H03K 5/00; H03D 3/24
[52] U.S. Cl. .................... 375/118; 375/110; 375/119; 328/151; 178/70 R
[58] Field of Search ............... 375/85, 86, 110, 118, 375/119; 328/151; 178/70 R

[56] References Cited

U.S. PATENT DOCUMENTS

| | | | |
|---|---|---|---|
| 3,404,232 | 10/1968 | Burford | 178/70 R |
| 3,665,472 | 5/1972 | Kartchner et al. | 375/109 X |
| 3,851,101 | 11/1974 | En et al. | 375/119 |
| 3,908,084 | 9/1975 | Wiley | 370/108 X |
| 3,936,604 | 2/1976 | Pommerening | 375/107 |
| 3,940,558 | 2/1976 | Gabbard et al. | 375/109 X |
| 3,980,820 | 9/1976 | Niemi et al. | 375/107 X |
| 4,031,317 | 6/1977 | McClain et al. | 375/109 |
| 4,208,724 | 1/1980 | Rattlingourd | 364/900 |
| 4,316,284 | 2/1982 | Howson | 375/109 X |
| 4,320,525 | 10/1979 | Woodward | 375/110 |
| 4,328,588 | 6/1982 | Smithson | 375/106 |
| 4,443,766 | 4/1984 | Belton, Jr. | 328/151 |
| 4,513,427 | 4/1985 | Borriello et al. | 375/110 |
| 4,573,173 | 2/1986 | Yoshida | 370/108 X |
| 4,575,860 | 3/1986 | Scordo | 375/110 |

FOREIGN PATENT DOCUMENTS 1125750 11/1984 U.S.S.R. .
1355495 6/1974 United Kingdom .

Primary Examiner—Stephen C. Buczinski
Assistant Examiner—Linda J. Wallace
Attorney, Agent, or Firm—Pollock, VandeSande & Priddy

[57] ABSTRACT

The present invention generates a data clock for data processing circuitry by developing an optimum locally generated clock signal which is selected with each received data message. This is achieved by utilizing a local crystal clock which serves as an input to a multiple active parallel tap delay line. A register has the various delay signals input to it and a window generator strobes the inputs to the register so as to process the strobed levels of the various delayed clock signals. This is done to detect a level transition in any of the clock phases. Gating circuitry then chooses an optimum clock phase which has undergone a transition in a desired direction during the time window when the various clock phases were strobed. As a result of the present invention, utilized bandwidth may be increased and data distortion is minimized so that the number of stations connected to a data bus provided with the data clock of the invention may be increased substantially.

7 Claims, 2 Drawing Sheets

HIGH SPEED DATA-CLOCK SYNCHRONIZATION PROCESSOR

This application is a continuation of application Ser. No. 000,504, filed Jan. 5, 1987, now abandoned.

FIELD OF THE INVENTION

The present invention relates to a digital data-clock synchronization processor, and more particularly to a digital process which synchronizes received serial data with a local crystal clock to permit error-free reception.

BACKGROUND OF THE INVENTION

To achieve an error-free data transmission over a single data path at very high data rate (especially when the rate is approaching the operating speed limit of the electronics of a data transmitter and receiver), the problem of accurately synchronizing the received data with the receiver local clock must be overcome. Previously, this problem was handled by encoding the data prior to its transmission with a timing signal of higher frequency than the data rate. The receiver, by analog means, then decoded the received signal back into data and the timing signal. The regenerated timing signal was used as the local clock for the data reception and/or data retransmission back to the transmission medium if the receiver was part of a data bus system. This previous approach has two main disadvantages:

(1) The timing signal encoding the data must be of higher frequency than the data rate. Because of this, the data rate remains significantly lower than the bandwidth of the transmission medium; and (2) In a data bus system the number of stations to be connected on the bus is limited. The clock which is extracted from the decoded data is used to retransmit the data back to the medium. This approach accumulates distortion on both the data and the clock because each is used in a closed loop to generate the other.

BRIEF DESCRIPTION OF THE PRESENT INVENTION

The invention permits non-return to zero (NRZ) data exchange between two or more devices at the maximum possible speed permitted by the digital electronics without any additional requirements of timing information exchange. The receiving device using this invention has the capability of generating an optimum receive clock-phase from its own crystal clock, which strobes the receive data into a register without any loss of information up to the maximum size of a message defined by the accuracy of the clock and the logic components used.

This newly invented processor is free from both of the above disadvantages since it permits:

(1) Uncoded data to be placed onto a transmission medium. As such, the data rate can reach the bandwidth of the transmission medium; and (2) The receiver, at the beginning of each received data block, to select a phase of its own crystal clock for purposes of receiving and retransmitting the data. The selected clock phase used as the data clock remains fixed for the entire receive/retransmit operation. By using a fixed data clock, the receiver places a new signal on the medium when the received data is retransmitted; and any distortion of data is removed. Removal of compounding signal distortion in turn removes the restriction on the number of stations permitted connection to a data bus.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
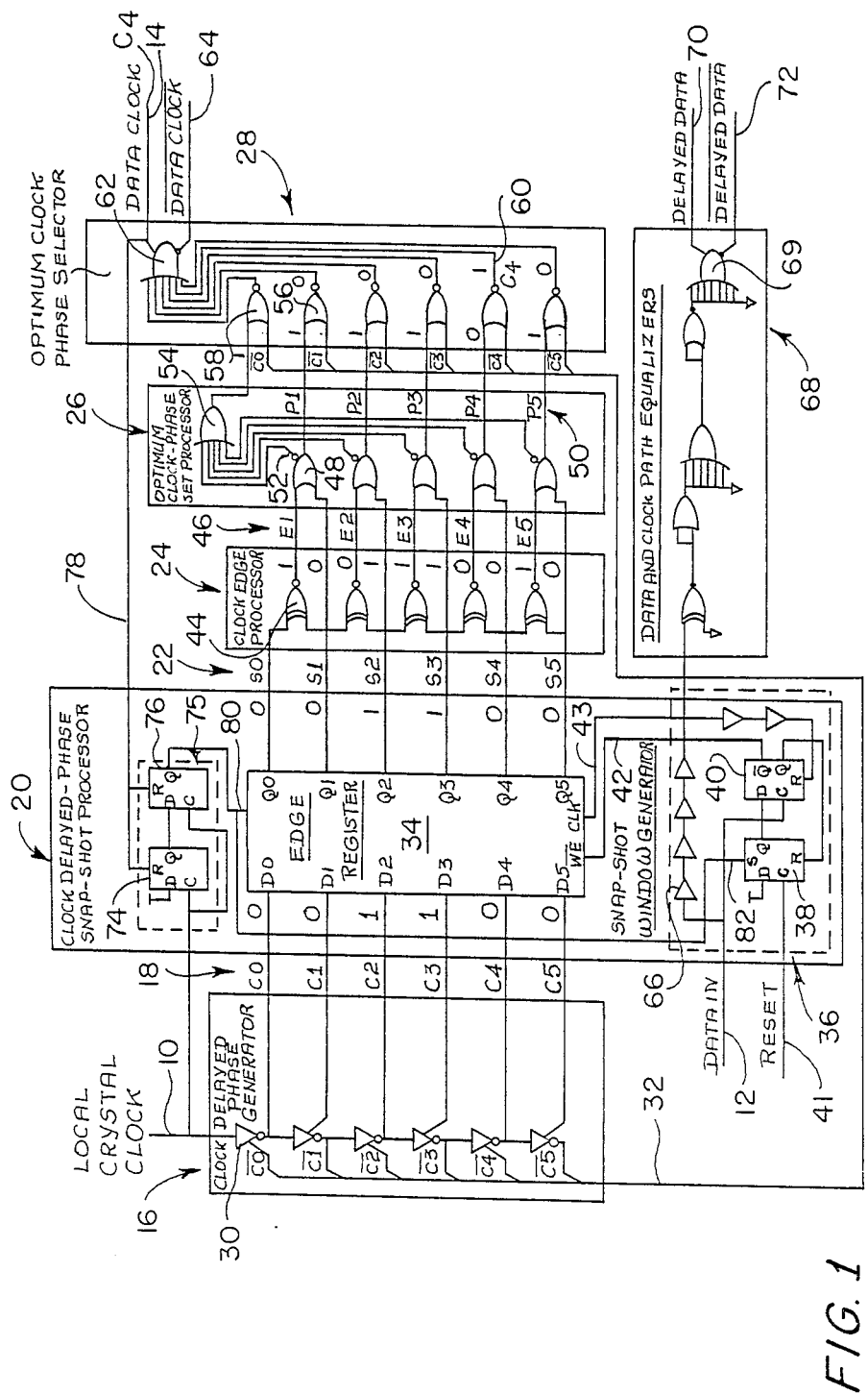
FIG. 1 is a logic diagram of a first embodiment of the present invention.

FIG. 1 is a logic diagram corresponding to the hardware realization of the high speed data-clock synchronization processor which constitutes one embodiment of the present invention. The purpose of the processor is to generate a data clock which is free from the disadvantages as previously explained in connection with the prior art. The data clock generated by the processor of the present invention utilizes a local crystal clock 10 which undergoes a series of parallel output delays through a clock-delayed phase generator 16. The parallel output signals 18 from the generator 16 are sequentially equally delayed. The purpose of the remaining hardware is to choose a particular clock phase of the various delayed outputs which represents an optimum clock phase that will act as the data clock for accurate synchronization of all circuitry provided with the data. The number of the delays in the clock-delayed phase genertor could vary to accommodate different synchronization accuracy.

The selection of the optimum clock phase begins at the clock-delayed phase snapshot processor 20 which samples the logic level of all delayed phase signals 18 during a short time interval (window) 36 and presents the sampled levels to a clock edge processor 24. The processor primarily consists of a level of gates which detects transitions or edges of the particular clock phases level during the window. The parallel outputs from the processor 24 are input to an optimum clock-phase set processor 26 which determines which of the parallel clock phases evidencing a transition are undergoing a particular transition (rising edge or falling edge) as is required because of the particular digital electronics family used. The final optimum clock phase selection occurs at a further level of logic circuitry, indicated as an optimum clock phase selector 28. This final selector 28 is provided with the parallel generated outputs of processor 26 along with respective complements of the original clock-delayed phases from generator 16. The outputs from individual gates of the phase selector 28 are summed together in gate 62 and the result will be an optimum data clock on output 14 and its complement output 64.

Data is provided to the processor 20 and particularly to snap-shot window generator 36 by input 12 and it is the data message which governs the generation of the window time interval for processor 20.

Now considering the circuitry of FIG. 1 in greater detail, the clock-delayed phase generator 16 is seen to include a plurality of serially connected digital delays 30 so as to form a digital delay line with multiple parallel taps. At the output taps of the phase generator 16 are the sequentially delayed local crystal clock signals referred to as the C set, shown by example to include $C_0$–$C_5$. This set is defined as $$C = \{C_0, C_1, \ldots, C_k\}$$

Where:
$C_0$ represents the local clock signal and
$C_k$ represents the most delayed clock signal.

This C set of clock signals is input to corresponding terminal $D_0$–$D_5$ of edge register 34. The input to the edge register will continually change and only when a clock transition occurs and a write enable pulse is provided at the register input terminal WE will the register become operative. While such an enable signal is provided to the edge register 34, a "snapshot window" is generated for a sufficient time for the register 34 to write the corresponding digital levels appearing at terminal $D_0$–$D_5$. The means for generating such a time window is accomplished by the snapshot window generator 36. The generator comprises first and second interconnected flip-flops 38 and 40. A system reset pulse will appear on input line 41 connected to a first input terminal of flip-flop 38. An input to this terminal will reset the generator flip-flops to an initial condition.

When a block of data appears on data input line 12, the second flip-flop 40 is set to generate a pulse along register input line 42, which will enable the writing of the C set out of register 34 during a window period which will occur during the first pulse of input data. The data along input line 12 then undergoes a delay through serial delays 66, the output of the last delay forming a clock input at terminal CLK of register 34 to clock the output of the stored levels written from edge register output $Q_0$–$Q_5$. From these outputs a second set (S set) of levels, corresponding to the C set and indicated as $S_0$–$S_5$, is generally indicated by reference numeral 22. This set of K+1 binary values is defined by $$S = \{S_0, S_1, \ldots, S_k\}$$

The snapshot window generator 36 permits a snapshot picture of the C set in the edge register 34 at the time the window is open and a signal edge appears for clocking. Either a continuous or a discrete number of snapshots may be selected by the generator. When only the first edge of the data block is used for a snapshot of the C set, a single, fixed delayed-phase is selected for the entire data block.

The next level of logic is generally indicated by reference numeral 24 and is indicated as the clock edge processor. This unit inputs the S set and generates a binary set called the E set at 46. The E set contains K binary values which are generated by comparing each pair of adjacent values of the S set. The values of $E_j = 0$ represent the discontinuity points of the set S.

The E set is defined as:

$$E = \{E_1, E_2, \ldots, E_k\}$$
Where:

$$E_j = \overline{S_{j-1}} \cdot S_j + S_{j-1} \cdot \overline{S_j} \text{ for } j = 1, 2, \ldots, K.$$

As will be seen the processor may include a single gating level of logic including identical gates 44. The output of a particular gate, by way of example, may generate a binary level 1 when adjacent inputs of the S set are the same while a binary 0 level is generated when adjacent levels of the S set are dissimilar indicating a transition region or "edge" in the S set.

The following level of logic is the optimum clock phase set processor 26 which includes a number of identical gates 48 having a first input connected to a corresponding line of the E set while a second input is connected to the corresponding line of the S set. Thus, by way of example, the uppermost gate 48 is provided with $E_1$ and $S_1$. The outputs from the gates 48 generate a binary set called the P set ($P_1$–$P_k$) indicated at 50. The set is defined as $$P = \{P_1, P_2, \ldots, P_k, K\}$$

Where:
A member of the set is defined by the binary value $P_j = E_j + S_{j-1}$, if a 0 to 1 transition of the S set is selected.

If the 1 to 0 transition is required to be selected because of the digital electronic family used, a in the example of FIG. 1, then the $P_j$ is defined as $P_j = E_j + S_j$.

The K output member of the P set is the binary sum at summer 54 of the inversion of all other members (such as output 52) of the P set, that is:

$$K = \sum_{i=1}^{k} \overline{P_j}$$

The final function to the optimum phase selection process is performed by selector 28 comprised of a level of logic implemented by identical gates such as 56 and 58. The top gate 58 is provided with the K output from summer 54 and a second output representing the complement of the clock-delayed phase $C_0$. The remaining gates are respectively connected to a corresponding output of the P set and a corresponding complement of the C set. The inverted outputs from the top gate 58 and the remaining gates 56 are summed in gate 62 or ORed together. Thus, the selector 28 inputs the P set and from it selects the optimum clock phase used as a data clock for the reception or retransmission of the received data. The data clock is defined as:

$$\text{Data Clock} = \sum_{e=1}^{n} P_e \cdot C_e + K \cdot C_0$$

where the sum and products represent binary operations. The output 14 of the summing gate 62 carries the data clock signal while output 64 carries the complement. These data clock outputs can then be connected to the data clock inputs of appropriate receiver or transmission circuitry which does not, per se, form part of the present invention.

In the example shown in FIG. 1, it will be seen that the output 60 from the clock operating upon the $P_4$ set input and the complement of $C_4$ from the delayed clock signals furnish a unique output when compared with the remaining gates of selector 28. Accordingly, the data clock outputs 14 and 64 will correspond with the optimum clock phase of $C_4$ and its complement. This will be the delayed clock signal that offers the first transition or edge in the selected direction after the initiation of data input along line 12. This optimum clock will remain the locally generated clock for connected utilization devices (not shown) for an entire data message. When a new data message occurs, the optimum clock selection is repeated.

Important to the operation during this process is the maintenance of time equality in the paths of clock and data. To achieve the equality, the data are sequentially delayed by being passed through the delays of equalizer 68. The delays are the same as the ones of the clock path. The last gate 69 of the equalizer 68 furnishes the data and inverted data as was originally presented along input line 12 but with the necessary delay equalization to be synchronized with the clock.

As a safety feature an anti-lock safeguard control 75 is provided. This control is comprised of two interconnected flip-flops 74 and 76 which are maintained in a reset condition as long as valid data clock signals occur along reset lines 78. However, when the data clock is lost, the flip-flops will furnish set signals to the master reset terminal 80 of edge register 34 and set terminal 82 of snapshot window generator flip-flop 38.

Figure 2:
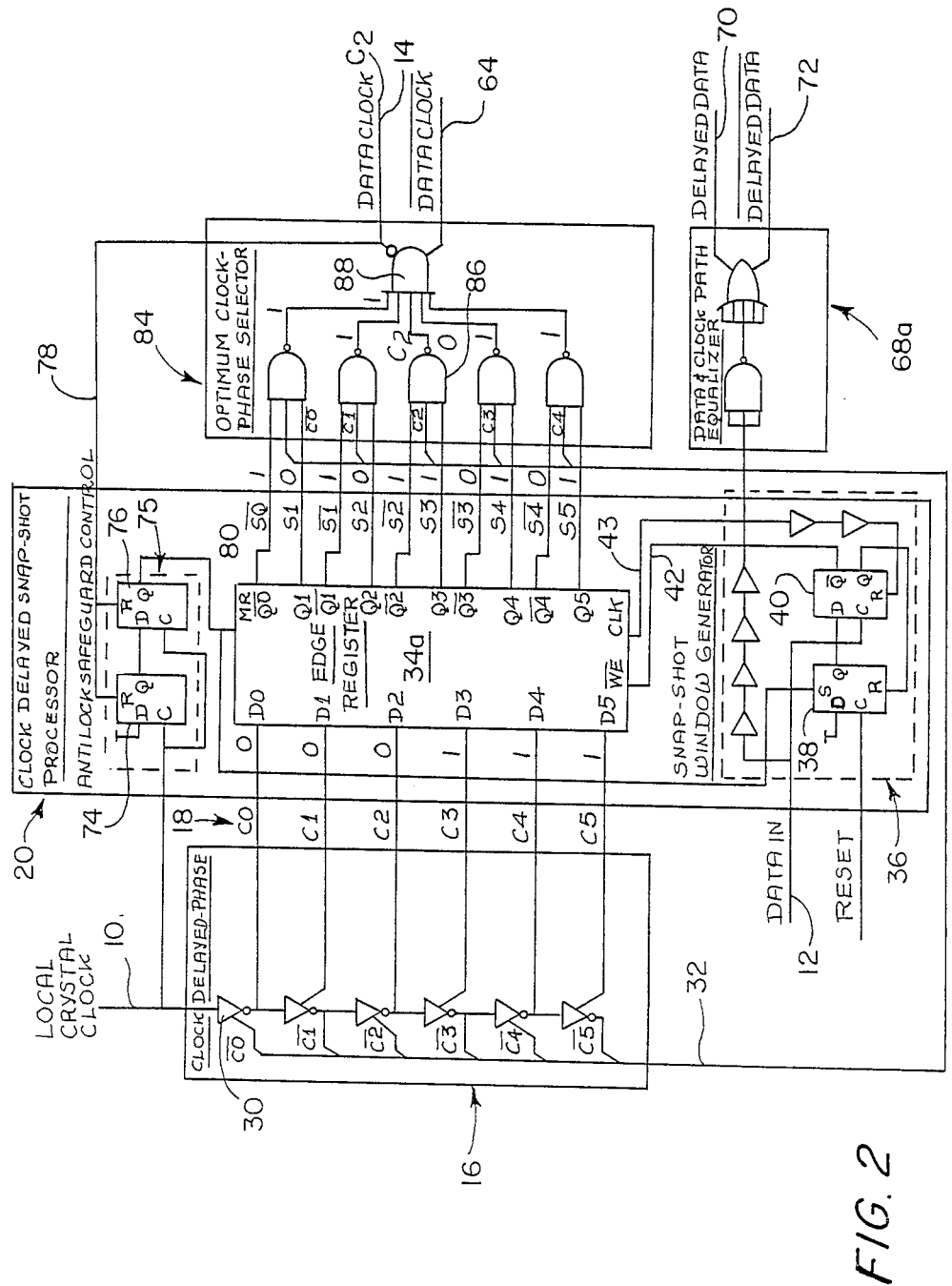
FIG. 2 is a logic diagram of a second embodiment of the present invention.

In the second embodiment of FIG. 2, the processor 24, 26 and selector 28 of FIG. 1 are replaced by an optimum clock-phase selector 84 which now defines the data clock as:

$$\text{Data Clock} = \sum_{i=1}^{k} S_{i-1} \cdot S_i \cdot C_{i-1}$$

Where:

Sums and products are binary operations.

Selector 84 comprises a single logic level performing AND NOT functions on the regular and inverted outputs of edge register 34a. For example, the upper gate of selector 84 is provided with the complement of the $S_0$ and $S_1$ levels in addition to the complement of the $C_0$ level from line 32 which provides the complemented C set delayed clocks from phase generator 16. By way of example using the 0-1 binary levels indicated at the input and output of register 34a, it will be seen that a unique output occurs from the third gate 86 which is provided with the invertor C2 input. This represents the optimum selected clock phase and will represent the signal appearing at the data clock 14.

Since the processors 24, 26 and phase selector 28 of the embodiment of FIG. 1 are compressed into the single logic level of selector 84, delay equalization for data will be less than in the case of equalizer 68 of FIG. 1. Accordingly, the data and clock path equalizer 68a are serially connected in the data path to provide equalized delay data at output terminal 70 and inverted data at 72.

As will be appreciated from the above description of the invention, the present invention is capable of generating a data clock from a local crystal clock by selecting an optimum clock phase from serially delayed local clock signal. As a result, the processor is capable of maximizing the bandwidth possible without the limitations imposed by the prior art encoded clock processors. Further, since a locally generated fixed data clock becomes available with each received data block, distortion of data is avoided and this enlarges the number of stations that may be connected to a data bus.

It should be understood that the invention is not limited to the exact details of construction shown and described herein for obvious modifications will occur to persons skilled in the art.

I claim:

1. A synchronizing circuit for generating a data clock from a local clock, the circuit comprising:
   multiple tap active delay line means connected to the local clock for generating delayed clock phases constituting a first signal set;
   means connected at its input to the first set for sampling the clock phases during a preselected timing interval following receipt of data by the circuit to produce second signal set, the sampling means comprising:
   (a) a register having inputs connected to respective clock phases;
   (b) means enabled by a reset signal and triggered by initial incoming data for strobing the register to enable writing of the first set from the register and producing the sampled clock phases continuously regardless of subsequent input data;
   means for selecting an optimum clock phase by detecting the occurrence of a preselected transition in a sampled clock phase; and
   terminal means connected to an output of the selecting means for making available the optimum clock phase as a data clock during the time period when data is received, the selecting means including a plurality of gates, each gate having
   (a) a first input connected to a corresponding delayed clock phase at the delay line means; and
   (b) second and third inputs connected to sequentially adjacent signals of the second set for determining which delayed clock phase has undergone a desired transition during a sampling interval thereby representing an optimum phase;
   the selecting means further including digital summing means connected at its input to the outputs from all the gates for producing the delayed optimum clock phase as a data clock.

2. The structure set forth in claim 1 together with means for delaying the received data for equalizing the circuit propagation time of the data clock and the data.

3. The structure set forth in claim 1, together with means responsive to the digital summing means output for recognizing failure of the circuit to produce an optimum clock phase whereby the responsive means causes reset of the register.

4. A synchronizing circuit for generating a data clock from a local clock, the circuit comprising:
   multiple tap active delay line means connected to the local clock for generating delayed clock phases constituting a first signal set;
   means connected at its input to the first set for sampling the clock phases during a preselected timing interval following receipt of data by the circuit to produce a second signal set, the sampling means comprising:
   (a) a register having inputs connected to respective clock phases;
   (b) means enabled by a reset signal and triggered by initial incoming data for strobing the register to enable writing of the first set from the register and producing the sampled clock phases continuously regardless of subsequent input data;
   means for selecting an optimum clock phase by detecting the occurrence of a preselected transition in a sampled clock phase; and
   terminal means connected to an output of the selecting means for making available the optimum clock phase as a data clock during the time period when data is received, the selecting means including a plurality of gates, the selecting means including
   (a) a first plurality of gates connected at their inputs to sequentially adjacent signals of the second set for generating a third signal set indicative of which phase has undergone a transition;
   (b) a second plurality of gates connected at their respective inputs to corresponding signals from the second and third sets to form a fourth signal set;

(c) a third plurality of gates connected at their respective inputs to corresponding signals from the third set and the delayed clock phases at the delay line means for detecting which phase has undergone a desired transition during a sampling interval, thereby representing an optimum phase; and (d) digital summing means connected at its input to all the outputs from the third gate plurality for producing the optimum clock phase as a data clock.

5. The structure set forth in claim 4 together with means for delaying the received data for equalizing the circuit propagation time of the data clock and the data.

6. The structure set forth in claim 4 together with means responsive to the digital summing means output for recognizing failure of the circuit to produce an optimum clock phase whereby the responsive means causes reset of the register.

7. The structure set forth in claim 4 together with a second digital summing means connected at its inputs to the outputs of the second plurality of gates to generate a default input to the third gates thereby producing a data clock even when a reset signal is present.

* * * * *

UNITED STATES PATENT AND TRADEMARK OFFICE
CERTIFICATE OF CORRECTION

PATENT NO. : 4,841,551

DATED : June 20, 1989

INVENTOR(S) : Napoleon G. Avaneas

It is certified that error appears in the above-identified patent and that said Letters Patent is hereby corrected as shown below:

Column 1, line 11, change "process" to --processor--;

line 59, change "block" to --clock--.

Column 3, line 10, change "WE" to --$\overline{WE}$--.

Column 4, line 14, change "electronic" to --electronics-- and change "a" to --as--;

line 20, change "$P_j$" to --$\overline{P_j}$--;

line 40, change "$P_e$" to --$\overline{P_e}$-- and change "K" to --$\overline{K}$--.

Column 5, line 18, change "$S_{i-1}$" to --$\overline{S_{i-1}}$-- and change "$C_{i-1}$" to --$\overline{C_{i-1}}$--;

line 35, after "clock" insert --output--;

UNITED STATES PATENT AND TRADEMARK OFFICE
CERTIFICATE OF CORRECTION

PATENT NO. : 4,841,551

DATED : June 20, 1989

INVENTOR(S) : Napoleon G. Avaneas

It is certified that error appears in the above-identified patent and that said Letters Patent is hereby corrected as shown below:

Col. 5, line 48, change "signal" to --signals--;

Col. 5, line 52, change "block" to --clock--.

Signed and Sealed this

Eighth Day of May, 1990

Attest:

HARRY F. MANBECK, JR.

*Attesting Officer*         *Commissioner of Patents and Trademarks*